April 3, 1962 G. N. CHATHAM ETAL 3,027,913

CHECK VALVE

Filed Jan. 29, 1959

INVENTORS
GEORGE N. CHATHAM and
OO SHURTLEFF
BY

Their Attorneys 3,027,913
CHECK VALVE
George N. Chatham and O O Shurtleff, Austin, Tex., assignors to Chatleff Valve & Manufacturing Company, Austin, Tex., a corporation of Texas
Filed Jan. 29, 1959, Ser. No. 789,844
2 Claims. (Cl. 137—484.2)

This invention relates to check valves that permit free flow of fluid in one direction but prevent it from flowing in the opposite direction, and more particularly to check valves suitable for refrigeration systems.

It is among the objects of this invention to provide a check valve, which is reliable, which is quickly responsive to slight reversals of fluid pressure, which opens and closes rapidly or at any desired rate, which is cushioned as it is opened and closed, which can be fully opened by a small pressure drop across the valve, and which will not vibrate.

The invention is illustrated in the accompanying drawings, in which

Figure 1:
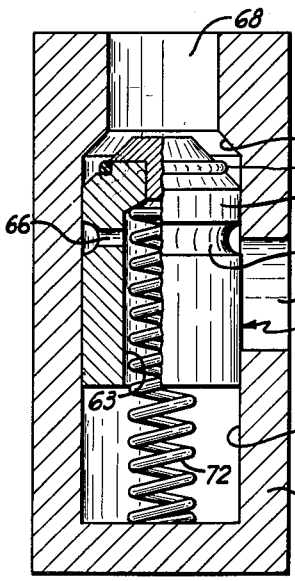
Figure 2:
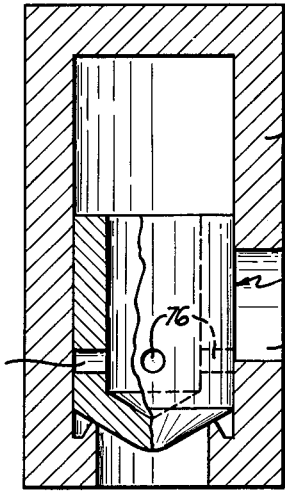
Figure 3:
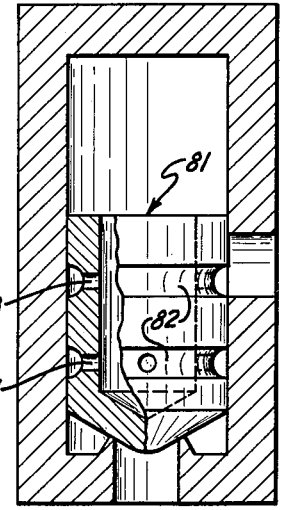

FIG. 1 is a longitudinal section through a valve housing, showing a valve plug near its seat; and FIGS. 2 and 3 are views, similar to FIG. 1, of two different modifications of the invention.

Referring to FIG. 1 of the drawings, a valve housing 62 is provided with a chamber 69 having a closed rear end and a front end provided with an inlet port 68. This port is surrounded inside the chamber by a suitable valve seat 67. The side wall of the chamber is provided with at least one outlet port 70 spaced lengthwise of the chamber from the valve seat. A valve plug 61 is slidingly mounted in the chamber for movement back and forth. The front end portion of the plug is provided with a short area that forms a piston 65 fitting snugly in the chamber between the two ports. The front end face of the piston carries a gasket 60 for engagement with the valve seat. With this construction, the plug must be moved back away from the seat an appreciable distance before the outlet port will be uncovered so that fluid can flow to it from the inlet port. In order to guide the short piston 65 and to control the rate of opening and closing of the valve, the plug should extend back beyond the outlet port toward the closed end of chamber 69, the side wall of which it may engage, or there may be about 0.005 inch clearance between them for freer sliding.

When the valve is closed, there is considerable space behind the plug, from which fluid must be allowed to escape if the plug is to be moved away from its seat. Consequently, communication is maintained between the back of the chamber and the outlet port, at least until the valve is fully open. The desired communication is maintained by providing plug 61 with an axial bore 63 extending from its rear end forward to a point inside the area surrounded by a circumferential groove 64 directly behind the plug piston 65. The groove and the inner or front end of the bore are connected by a radial opening 66, so that when the plug is moved backward away from its seat the fluid trapped in the chamber 69 behind the plug can flow forward through bore 63 and opening 66 and into groove 64, from which it will escape into the outlet port 70.

If it is assumed that the valve is in use and the plug is held against its seat by fluid pressure at the outlet 70, and that suddenly the fluid pressure at the inlet port becomes greater than at the outlet, the pressure against the front end of the plug will push the plug back away from its seat. The full force of the fluid will be effective at the start, because it cannot escape past the piston. Due to the fact that the piston must move an appreciable distance before it will allow the incoming fluid to reach the outlet port, the plug develops considerable momentum, which helps it to open rapidly. The rate of movement of the plug depends on several factors, including the compressibility and viscosity of the fluid in the chamber behind the plug, the radial clearance between plug and housing, and also the size of opening 66 and groove 64. Unless the fluid is compressible, the plug cannot be moved back any faster than fluid can escape from the back part of the chamber. The plug moves back uniformly until its piston 65 begins to uncover the outlet port. Then two additional dynamic forces begin to act.

The first force is due to a venturi effect produced by the rapid flow of fluid from the inlet into the outlet port, which reduces the fluid pressure at groove 64 and thereby permits the fluid trapped behind the plug to escape more rapidly. This force continues to operate until the plug has moved as far as possible. In the meantime, however, the second force begins to act. This is the impact force of the fluid against the front end of the plug, due to the change in direction of flow from inlet to outlet. This impact force tends further to move the plug as far as possible from the valve seat and to hold the valve fully open.

The combination of the various actions just described causes the valve to open promptly and smoothly with a low pressure differential, and to open fully and stay open without chattering or fluttering during a very wide range of flow rates, either steady or fluctuating. This makes the valve especially suitable for refrigeration cycles, where boiling of the fluid will cause an ordinary check valve to chatter violently. Because the fluid behind the plug must escape as the plug is forced back, the plug will not slam back against the rear end of the housing chamber, which would shorten the life of the valve.

Whenever the pressure differential across the valve is reversed, thereby tending to cause fluid to flow from the outlet port to the inlet port, the valve likewise closes rapidly and smoothly with a minimum of impact damage. Thus, the moment fluid begins to move from the outlet 70 to the inlet of the valve, the static pressure on the exposed or front end of the plug becomes less than it was immediately before. The greater static pressure of the fluid behind the plug will then be sufficient to move the plug forward the very slight amount required for putting groove 64 into communication with the outlet port. Upon that happening, fluid from the outlet port flows back through radial opening 66 and axial bore 63 and into the chamber behind the plug to help move the plug ahead while the impact pressure of the fluid from the outlet port entering the groove also pushes the valve forward. The moment piston 65 shuts off communication between the two ports, the full pressure differential becomes available to move the plug the rest of the way against its seat and to hold it there.

During closing of the valve, the restriction to fluid flow afforded by the passage between the outlet port and the back of chamber 69 limits the speed of movement of the plug and thereby reduces the impact of the plug against its seat. If uncontrolled, that impact might rapidly wear or even damage the seat and the mating surface of the plug. The pressure against the rear end of the plug and the back of the piston keeps the valve closed until such time as the fluid pressure at the inlet port again becomes greater than the pressure at the outlet.

This valve is simple and rugged in construction and will operate over long periods of time through a greater number of cycles with very little wear, so that it can be sealed and permanently installed to last for the life of the equipment with which it is used.

FIG. 1 also illustrates another feature that may be used with any of the plugs disclosed herein. It is a spring 72 for holding the piston portion of the plug between the inlet and outlet ports when the pressure at both ports is substantially equal. It is desirable that the plug be located in this position in order that it will be quickly responsive to fluid flow in either direction the moment flow starts. The spring can be used to overcome friction when the plug is horizontal, or to counterbalance the weight of the plug when the inlet port is at the top of the valve. This spring does not perform the usual function of a spring in check valves. It is much lighter than those used before and it is made too short to hold the plug against its seat, as indicated in the drawing. All it does is prevent the plug from moving to or staying in fully open position whenever the flow through the system is shut off. Then, if flow is started in the reverse direction from outlet port to inlet, the plug will be seated immediately by the difference in fluid pressure at the two ports. Also, the spring can be used to shorten the first phase of the closing cycle where exceptionally fast closing against reverse flow is required. Thus, if it is assumed that the valve is open and reverse flow is about to start, the piston area must move forward past the outlet port before flow will be cut off. This movement may not be as fast as desired in some cases, so a spring of correct size can be used to push the piston ahead more rapidly until the circumferential groove 64 communicates with the outlet port and the other forces come into operation.

A modification of the valve plug shown in FIG. 1 is disclosed in FIG. 2. Instead of providing the hollow plug 75 with a circumferential groove connected by a single opening with the inside of the plug, the groove is omitted and the plug is provided with a sufficient number of radial openings 76 to assure at least one of them always being in communication with the outlet port 77 in the housing 78 during the time that otherwise a circumferential groove would open into the port.

The embodiment of the invention shown in FIG. 3 permits the valve plug to move away from its seat at a varying rate, such as rapidly at first and then more slowly, or vice versa. The hollow plug 81 has a pair of grooves 82 connected with the interior of the plug by means of radial openings 83 and 84. By using more openings at one groove than at the other, or by using the same number but a different size, the rate of opening and closing can be controlled.

According to the provisions of the patent statutes, we have explained the principle of our invention and have illustrated and described what we now consider to represent its best embodiment. However, we desire to have it understood that, within the scope of the appended claims, the invention may be practiced otherwise than as specifically illustrated and described.

We claim:

1. A check valve comprising a housing provided with a cylindrical chamber and a front end provided with an axial inlet port, a valve seat inside the chamber around said port, the side of the housing being provided with an outlet port spaced lengthwise of the chamber from said seat, said chamber having a uniform diameter and smooth side wall from said seat rearwardly to behind said outlet port, and a cup-like plug slidingly disposed in the chamber having a piston front end portion fitting the chamber between said ports and adapted to be sealingly held against said seat by fluid pressure at the outlet port, the plug being provided with a circumferential groove immediately behind said piston end portion, the rear end of said piston end portion normally being disposed in front of the outlet port and forming the front edge of said groove, the plug behind the groove being cylindrical and extending across the outlet port into the rear end of the chamber in sliding engagement with the side wall thereof and being provided with a rearwardly opening axial bore extending forward in the plug to a point near its front end, the plug also having a radial opening connecting said groove with said bore to form a passage maintaining communication between the rear end of the chamber and the outlet port while the valve is opening when fluid pressure at the inlet port exceeds the pressure at the outlet port, and said chamber being long enough to permit said piston end portion to be moved rearwardly out of the part of the chamber between said ports and then across the outlet port to establish communication between the two ports and thereby open the housing, said piston end portion shielding said radial opening from fluid entering the open housing through said inlet port and deflecting that fluid laterally through said outlet port and with respect to said radial opening so as to reduce the fluid pressure in said passage and in the area between the plug and the rear end of the chamber.

2. A check valve comprising a housing provided with a cylindrical chamber and a front end provided with an axial inlet port, a valve seat inside the chamber around said port, the side of the housing being provided with an outlet port spaced lengthwise of the chamber from said seat, said chamber having a uniform diameter and smooth side wall from said seat rearwardly to behind said outlet port, a cup-like plug slidingly disposed in the chamber having a piston front end portion fitting the chamber between said ports and adapted to be sealingly held against said seat by fluid pressure at the outlet port, the plug being provided with a circumferential groove immediately behind said piston end portion, the rear end of said piston end portion normally being disposed in front of the outlet port and forming the front edge of said groove, the plug behind the groove being cylindrical and extending across the outlet port into the rear end of the chamber in sliding engagement with the side wall thereof and being provided with a rearwardly opening axial bore extending forward in the plug to a point near its front end, the plug also having a radial opening connecting said groove with said bore to form a passage maintaining communication between the rear end of the chamber and the outlet port while the valve is opening when fluid pressure at the inlet port exceeds the pressure at the outlet port, and said chamber being long enough to permit said piston end portion to be moved rearwardly out of the part of the chamber between said ports and then across the outlet port to establish communication between the two ports and thereby opening the housing, said piston end portion shielding said radial opening from fluid entering the open housing through said inlet port and deflecting that fluid laterally through said outlet port and with respect to said radial opening so as to reduce the fluid pressure in said passage and in the area between the plug and the rear end of the chamber, and a coil spring in said axial bore and projecting therefrom to hold said piston end portion in said part of the chamber between said ports when the fluid pressure at both ports is substantially equal, the spring being too short to hold the plug against said seat if the valve is disposed with its inlet port at the top.

References Cited in the file of this patent

UNITED STATES PATENTS

| | | |
|---|---|---|
| 489,799 | Ford | Jan. 10, 1893 |
| 704,557 | Michener | July 15, 1902 |
| 867,702 | Clarke | Oct. 8, 1907 |
| 1,029,464 | Ruwell | June 11, 1912 |
| 1,252,940 | Osborne | Jan. 8, 1918 |
| 1,322,938 | Parker | Nov. 25, 1919 |
| 2,440,027 | Stoyke | Apr. 20, 1948 |
| 2,688,980 | Pool | Sept. 14, 1954 |